US010947034B2

(12) United States Patent
Bugnano et al.

(10) Patent No.: US 10,947,034 B2
(45) Date of Patent: Mar. 16, 2021

(54) CARTRIDGE, MACHINE AND SYSTEM FOR THE PREPARATION OF BEVERAGES AND PROCESS FOR MANUFACTURING THE CARTRIDGE

(71) Applicant: LUIGI LAVAZZA S.P.A., Turin (IT)

(72) Inventors: Luca Bugnano, Moncalieri (IT); Alberto Cabilli, Moncalieri (IT)

(73) Assignee: LUIGI LAVAZZA S.P.A., Turin (IT)

( * ) Notice: Subject to any disclaimer, the term of this patent is extended or adjusted under 35 U.S.C. 154(b) by 0 days.

(21) Appl. No.: 16/185,798

(22) Filed: Nov. 9, 2018

(65) Prior Publication Data

US 2019/0077587 A1 Mar. 14, 2019

Related U.S. Application Data

(62) Division of application No. 14/766,931, filed as application No. PCT/IB2014/059155 on Feb. 21, 2014, now abandoned.

(30) Foreign Application Priority Data

Feb. 22, 2013 (IT) .......................... TO2013A000146

(51) Int. Cl.
*B65D 85/80* (2006.01)
*A47J 31/06* (2006.01)
(Continued)

(52) U.S. Cl.
CPC ...... *B65D 85/8043* (2013.01); *A47J 31/0668* (2013.01); *A47J 31/407* (2013.01); *B65D 65/466* (2013.01)

(58) Field of Classification Search
CPC .......................... B65D 85/8043; B65D 65/466; B65D 85/804; B65D 85/8046; A47J 31/00; A47J 31/407; A47J 31/0668
See application file for complete search history.

(56) References Cited

U.S. PATENT DOCUMENTS 3,292,527 A * 12/1966 Stasse ................ B65D 85/8043
99/295
3,403,617 A 10/1968 Lampe
(Continued)

FOREIGN PATENT DOCUMENTS

CH          406 561 A      1/1966
CH          406561 A   *   1/1966   ......... B65D 85/8043
(Continued)

OTHER PUBLICATIONS

International Search Report for PCT/IB2014/059155 dated May 28, 2014 [PCT/ISA/210].
(Continued)

*Primary Examiner* — Ericson M Lachica
(74) *Attorney, Agent, or Firm* — Sughrue Mion, PLLC

(57) ABSTRACT

The cartridge (1) according to the invention comprises an envelope (2) having a first and a second end wall (4, 5) connected together by an annular lateral wall (6) and defining an inner chamber (7) containing a quantity or dose of a substance (S) for preparation of the beverage. The envelope (2) has at least one first and at least one second permeable wall (6a, 5) acting as an inlet for the introduction of a flow of water into the chamber (7) and as an outlet from it respectively for outflow of the beverage from chamber (7). Between the first and the second permeable walls (6a, 5) the envelope (2) has an outwardly projecting annular formation (3g). A portion of the permeable inlet wall (6a) for the introduction of water into the chamber (7) is made in the annular lateral wall (6) of the envelope (2). The annular formation (3g) extends from the second end wall (5) in a direction substantially opposite to the first end wall (4).

9 Claims, 3 Drawing Sheets

(51) Int. Cl.
   *B65D 65/46*    (2006.01)
   *A47J 31/40*    (2006.01)
   *B65D 85/804*   (2006.01)

(56) References Cited

U.S. PATENT DOCUMENTS

| | | | |
|---|---|---|---|
| 3,470,812 A | | 10/1969 | Levinson |
| 3,607,297 A | | 9/1971 | Fasano |
| 4,136,202 A | * | 1/1979 | Favre ................ B65D 85/8043 426/77 |
| 2003/0222089 A1 | | 12/2003 | Hale |
| 2004/0115317 A1 | * | 6/2004 | Doglioni ............ A47J 31/0673 426/123 |
| 2005/0016383 A1 | | 1/2005 | Kirschner et al. |
| 2006/0019000 A1 | | 1/2006 | Zanetti |
| 2006/0110507 A1 | * | 5/2006 | Yoakim ............. B65D 85/8043 426/433 |
| 2007/0186784 A1 | * | 8/2007 | Liverani ............ A47J 31/0668 99/295 |
| 2011/0259779 A1 | * | 10/2011 | Moutty ............. B65D 85/8043 206/524.1 |

FOREIGN PATENT DOCUMENTS

| | | |
|---|---|---|
| EP | 0 199 953 A1 | 12/1986 |
| EP | 0 211 511 A1 | 2/1987 |
| EP | 0 242 556 A1 | 10/1987 |
| EP | 0 468 078 A1 | 1/1992 |
| EP | 0 469 162 A1 | 2/1992 |
| EP | 0 507 905 A1 | 10/1992 |
| EP | 1961676 A2 * | 8/2008 ......... B65D 85/8043 |
| EP | 2 218 653 A1 | 8/2010 |
| EP | 2 412 646 A1 | 2/2012 |
| FR | 757 358 A | 12/1933 |
| FR | 1 543 608 A | 10/1968 |
| FR | 2 373 999 A1 | 7/1978 |
| FR | 2373999 A1 * | 7/1978 ......... B65D 85/8043 |
| FR | 2 556 323 A1 | 6/1985 |
| GB | 938617 A | 10/1963 |
| GB | 2 023 086 A | 12/1979 |
| WO | 86/002537 A1 | 5/1986 |
| WO | 2004/087529 A1 | 10/2004 |
| WO | 2010/106516 A1 | 9/2010 |
| WO | 2010/134036 A1 | 11/2010 |
| WO | 2012/104795 A1 | 8/2012 |
| WO | 2012/164521 A1 | 12/2012 |
| WO | WO-2012164521 A1 * | 12/2012 ......... B65D 85/8043 |
| WO | 2013/111088 A1 | 8/2013 |

OTHER PUBLICATIONS

Written Opinion for PCT/IB2014/059155 dated May 28, 2014 [PCT/ISA/237].

* cited by examiner

CARTRIDGE, MACHINE AND SYSTEM FOR THE PREPARATION OF BEVERAGES AND PROCESS FOR MANUFACTURING THE CARTRIDGE

CROSS REFERENCE TO RELATED APPLICATIONS

This application is a divisional of U.S. application Ser. No. 14/766,931, filed Aug. 10, 2015, which is a National Stage of International Application No. PCT/IB2014/059155 filed Feb. 21, 2014, claiming priority based on Italian Patent Application No. TO2013A000146 filed Feb. 22, 2013, the contents of all of which are incorporated herein by reference in their entirety.

BACKGROUND OF THE INVENTION

Field of the Invention

This invention relates to systems for the preparation of beverages, in particular coffee, through the use of prepacked cartridges.

Background

The cartridges (or capsules or pods, according to other current names) for the preparation of liquid food products, for example beverages, through the addition of a liquid (which may be under pressure and/or at high temperature) and/or steam, form part of a very rich and varied technological sector as documented for example by FR-A-757 358, FR-A-2 373 999, FR-A-2 556 323, GB-A-938 617, GB-A-2 023 086, CH-A-406 561, U.S. Pat. Nos. 3,403,617, 3,470, 812, 3,607,297, WO-A-86/02 537, EP-A-0 199 953, EP-A-0 211 511, EP-A-0 242 556, EP-A-0 468 078, EP-A-0 469 162, EP-A-0 507 905, WO 2010/106516 A1 and EP-A-2 218 653.

Many of the solutions described in the abovementioned documents primarily refer to the preparation of liquid products comprising beverages such as coffee, tea, chocolate, consommés, soups or various infusions.

The invention specifically relates to a cartridge for the preparation of a beverage, of the type comprising
an envelope having first and second end walls connected to each other by an annular lateral wall defining an internal chamber containing an amount or dose of a substance for preparation of the beverage;
the said envelope having at least one first and at least one second permeable wall acting as an inlet and an outlet respectively for the introduction of a flow of water into the said chamber and respectively for outflow of the beverage from the said chamber; the envelope having an outwardly projecting annular formation between the said first and second permeable walls; and in which
the said at least one permeable inlet wall portion for the introduction of water into the said chamber is made in the annular lateral wall of the envelope.

Cartridges of this type are described in international patent application WO2012/164521A1 in the name of the Applicant. In these cartridges the envelope comprises a substantially cup-shaped body made of an injection moulded plastics material which has an annular formation projecting radially outwards from an intermediate portion of its lateral wall. When in use this projecting annular formation is intended to abut against a corresponding shoulder provided in the infusion chamber of a machine used for the preparation of a beverage in order to provide a liquid-tight separation between the portion of the cartridge through which pressurised water is introduced and the portion through which the beverage leaves the cartridge.

One object of this invention is to provide a cartridge of the type initially defined configured in such a way that it can also be used in a machine for the preparation of beverages which is designed for the use of another (and different) type of cartridge, in particular a machine of the type described in Italian patent application TO2012A000061 in the name of the Applicant.

In general, in fact, the market for cartridges for coffee and/or beverages in general provides that these cartridges are combined with or configured for use with a specific delivery machine which is capable of supplying hot water and/or steam for infusion of the beverage. In this context solutions in which a consumer purchases a coffee machine and is subsequently supplied with cartridges specifically designed and constructed for operation in combination with that machine are known and widely used.

In such cases some salient characteristics of the cartridge/machine system, such as one or more of the following, are defined for the consumer at the time of purchase and cannot be modified subsequently:
the external shape of the cartridge for the purpose of insertion into the machine,
the manner in which the cartridge is inserted at the outset,
the configuration of the infusion chamber containing the cartridge during the process of extracting the liquid product, that is the beverage,
the manner in which the material comprising the cartridge interacts with the infusion chamber,
the manner in which the beverage is extracted, and
the manner in which the cartridge is expelled after the beverage has been delivered.

This invention is intended to provide a cartridge which in addition to functioning in a machine provided with a cartridge holder specifically designed and manufactured for it is capable of being used effectively in a machine which has a cartridge holder of a different type belonging to the prior art. This is in order to offer the consumer, or the owner of such a machine according to the prior art, the possibility of widening the range of cartridges which can be used and the food products which can be produced, for example by making it possible to produce coffee of the "filter coffee" or extracts from "leaf" products in addition to coffee of the "espresso" type.

Another object of this invention is to provide a cartridge which can be conveniently made using a biodegradable/compostable material as defined below in this description.

SUMMARY OF THE INVENTION

The abovementioned objects and yet others are accomplished according to the invention through a cartridge for the preparation of a beverage of the type initially defined, characterised in that the aforesaid annular formation extends from the said second end wall of the envelope of the cartridge in a direction substantially opposite to the said first end wall.

In a currently preferred embodiment the aforesaid annular formation extends as an extension of the lateral wall of the envelope projecting beyond the second end wall, substantially in the axial direction of the said envelope.

Further characteristics of a cartridge according to the invention are defined in the dependent claims.

As has been mentioned previously, a cartridge according to the invention may be conveniently manufactured from a compostable/biodegradable material.

The characteristics which a material must have in order to be defined as being compostable, according to a currently accepted definition even among patents (see for example EP-B-0 497 838, EP-B-0 561 982, EP-B-0 788 733, EP-B-0 723 572, EP-B-0 868 275, EP-B-0 971 818 and EP-B-1 842 944), have been established, for example, by European standard EN 13432 "Requirements for packaging recoverable through composting and biodegradation—testing scheme and evaluation criteria for the final acceptance of packaging", adopted in Italy under the name UNI EN 13432.

According to this standard the characteristics which a compostable material must have are those listed below:

biodegradability, that is metabolic conversion of the compostable material into carbon dioxide, this property being measured through a standard test method—draft EN 14046 (also published as ISO 14855: biodegradability under controlled composting conditions); the acceptance level is 90% (with respect to cellulose) which has to be achieved in less than six months;

disintegratability, that is fragmentation of the final compost and its loss from visibility (lack of visual contamination); this is measured by a pilot scale composting test (draft EN 14045): samples of the material under test are composted together with organic wastes for three months; at the end of this the compost is screened through a 2 mm sieve. The mass of residue of the test material having dimensions >2 mm should be less than 10% of the initial mass;

absence of adverse effects on the composting process: this is checked by a pilot scale composting test;

low levels of heavy metals (below predetermined maximum levels) and the absence of adverse effects on the quality of the compost (e.g.: reduction of the agricultural value and the presence of ecotoxicological effects on plant growth); a plant growth test (modified OECD test 208) is performed on compost samples in which degradation of the test material has taken place: no difference between that and a control compost should be shown;

other chemical and physical parameters which should not change after the material under investigation has degraded: pH; salt content; volatile solids; N; P; MgpK.

It will be appreciated that a biodegradable material is not necessarily compostable, because it must also disintegrate during a composting cycle. On the other hand a material which breaks up into microscopic pieces during a composting cycle, such that they are then not wholly biodegradable, is not compostable.

Standard UNI EN 13432 is a harmonised standard and has been published in the Official Gazette of the European Community, and has been accepted in Europe at national level and provides a presumption of conformity with European Directive 94/62 EC on packaging and packaging wastes.

With the increasing interest in the environment and the end of life of food wastes produced on a daily basis, compostability has become an increasingly important requirement for consumers of the cartridges (or capsules or pods) considered here.

In this respect the solution of resorting to a compostable material, that is—according to a name sometimes used in the industry—a "bio" material, to manufacture the body of such cartridges has been found to be promising, such as for example:

polylactic acid (PLA),
poly-L-lactide (PLLA),
poly-D-lactide (PDLA),
a stereocomplex blend of PDLA and PLLA
maize starches,
cellulosic materials,
formulations based on PLA, PDLA, PLLA in combination with mineral fillers,
formulations based on PLA, PDLA, PLLA in combination with mineral fillers and plasticisers,
formulations based on PLA, PDLA, PLLA and cellulose,
formulations based on maize starches in combination with mineral fillers,
polybutylene succinate,
polybutylene succinate in combination with mineral fillers,
polymers produced by microorganisms or bacteria such as PHA (polyhydroxy alkanoates) and PHB (poly-beta-hydroxybutyrate),
materials resulting from the combination of plant fibres and starches,
materials resulting from the combination of plant biomass and starches,
materials resulting from the combination of plant fibres and PLA,
materials resulting from the combination of plant biomass and PLA, and
combinations of the materials listed above.

It has been observed that these "bio" materials used for the manufacture of cartridges for use in coffee machines provided with perforating punches can give rise to high elongation on fracture such as to render the acts of perforation not very effective, for example when the material forms a kind of cap around the punch instead of tearing, giving rise to possible problems with delivery.

This perforation difficulty may be encountered in the case of cartridges according to the prior art described in previous application TO2012A000061: introduction of hot water into the cartridge gives rise to an interaction between the perforating/tearing components located on the machine with corresponding projections in the form of pendants or recesses located on the edge of the cartridge. This difficulty is overcome through this invention because it does not involve any interaction between the cartridge and machine with regard to perforation/tearing.

A cartridge body of such a material may be manufactured in various embodiments using a moulding process subdivided into two substages:

filling of the mould cavity,
residence of the material in the sealed mould maintained at a temperature above ambient temperature or alternatively subsequent curing in a stove or through the effect of UV radiation.

As already described above, one object of the invention is to provide a cartridge which is able to extend the types of cartridges which can be used in a machine according to the prior art, in particular a machine of the type defined in previous Italian patent application TO2012A000061.

This application describes a type of cartridge in which the base (which represents the "outlet" for the beverage) deforms through the effect of the pressure of the liquid/steam introduced into the cartridge so that it is perforated by a second set of hollow points (broadly similar to injection needles) having filtering properties. These construction embodiments are in themselves known, and are particularly suitable for the delivery of beverages such as espresso coffee, in that perforation of the base through the pressure effect is a salient characteristic to create the necessary hydraulic conditions for pressurised hot water flow (typically in the range 3-9 bar depending upon the products).

Documents such as EP 1 295 554 A1, WO 2006/005736 A2 or EP 1 886 942 A1 identify specific solutions inherent to filtering points, the mechanism for opening/closing/perforating by means of the perforating points and the type of cartridge, with corresponding systems.

In current manufacturing practice provision may be made for the lateral wall and the base wall of the cartridge to be made of a plastics material such as, for example, polypropylene coextruded in lamination with ethylene-vinyl-alcohol (EVOH), which is shaped by thermoforming. It is also known that a composite material of such a nature cannot therefore be classified as a compostable material.

This technology is restricting as regards the range of products which can be obtained from the aforesaid cartridge/machine combination, ruling out all those beverages which require an extraction pressure of zero (ambient pressure), such as for example "filter coffee" or "leaf" tea, which can be obtained conventionally through the simple gravimetric percolation of hot water.

In the case of the cartridge according to this invention there is no particular interaction between the base of the cartridge and the filtering points, so it is also possible to deliver under environmental pressure conditions.

The invention also relates to a machine for the preparation of beverages designed for the use of a cartridge according to the invention, this machine comprising an infusion unit capable of receiving a cartridge according to this invention with which are associated means for the delivery of a flow of water intended to be introduced into the cartridge, and means for discharging the outflow of beverage formed in the infusion unit to a collecting vessel;

the infusion unit including a plurality of parts which can be moved closer to and further away from each other, and which can be connected together in a leak-proof way to define overall an infusion chamber into which the said cartridge can be placed; the infusion chamber being capable of forming an annular space relative to the cartridge according to the invention positioned therein which can be connected to means for the delivery of water and which is separated from the discharge means in a liquid-tight way.

The invention also relates to a system for preparing beverages comprising such a machine and a cartridge of the new type having the characteristics defined above.

Finally the invention also relates to a process for manufacturing the body of a cartridge according to the invention, the said process comprising the operations or stages defined herein.

BRIEF DESCRIPTION OF THE DRAWINGS

Further characteristics and advantages of the invention will be apparent from the detailed description which follows, purely by way of a non-limiting example, with reference to the appended drawings in which:

In FIGS. 1 to 4, 1 indicates overall a cartridge according to this invention for the preparation of a beverage, for example espresso coffee.

DETAILED DESCRIPTION OF THE INVENTION

Cartridge 1 comprises an envelope 2, for example of food-grade plastics material.

In the embodiment illustrated envelope 2 comprises a body 3, essentially in the shape of a cup, which is closed off at the top by an end wall or cover 4. Both cup body 3 and cover 4 may for example be manufactured by injection moulding, and may be joined together in any way which is known, for example by welding, adhesive bonding, etc.

In the embodiment illustrated envelope 2 as a whole has a general shape of an essentially truncated frustoconical type. As an alternative this envelope may have a general configuration which is for example cylindrical or prismatic.

Figure 1:
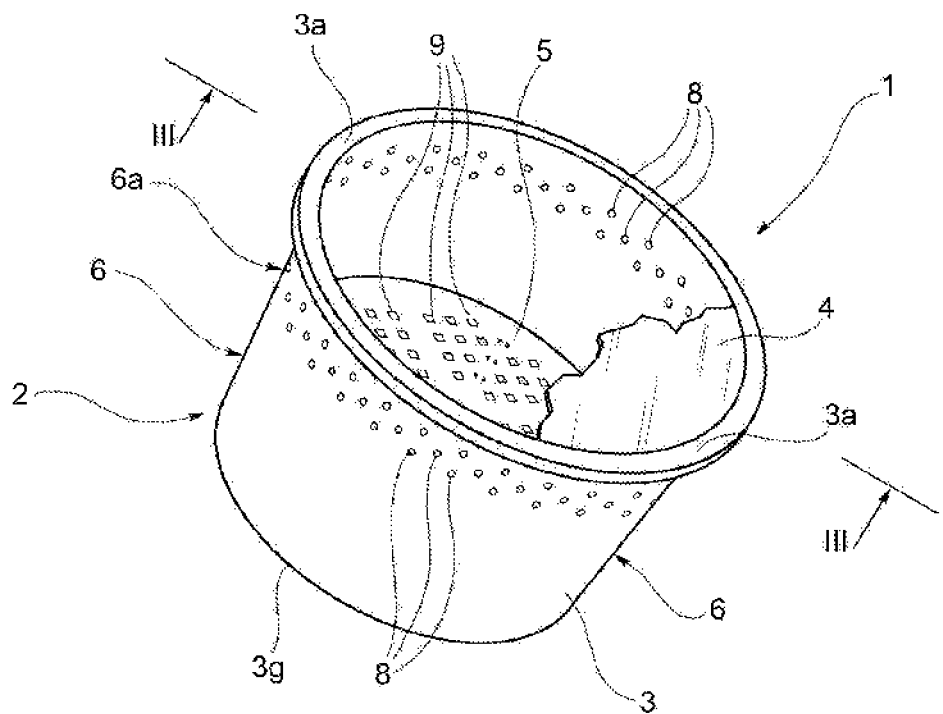
FIG. 1 is an exploded perspective view of a cartridge according to this invention.
Figure 3:
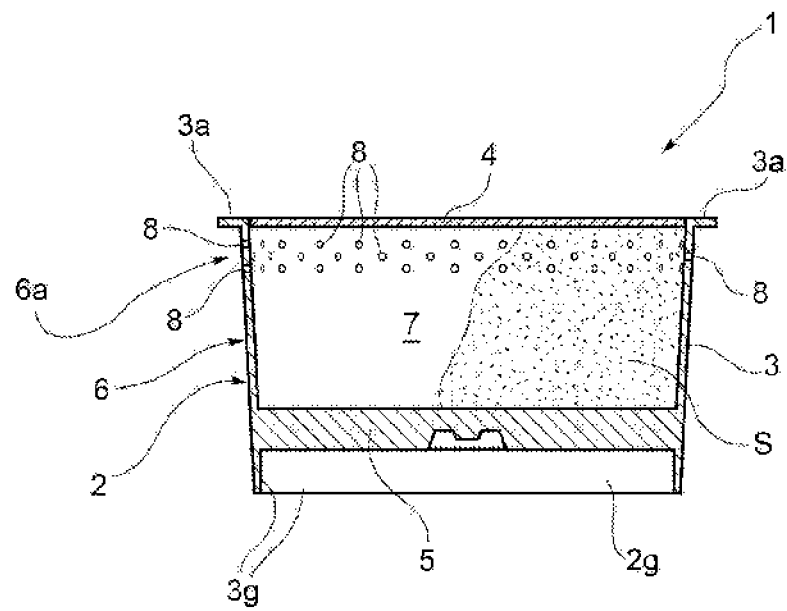
FIG. 3 is a cross-section view according to the line III-III in FIGS. 1 and 2.

Cup-shaped body 3 has a lower end wall 5, essentially parallel to cover 4 and connected to a lateral wall 6 of substantially annular shape (see in particular FIGS. 1 and 3).

Envelope 2 defines within it a region or chamber 7. This region or chamber 7 contains a quantity or dose of a substance S for the preparation of a beverage, such as for example ground roast coffee (FIG. 3).

Upper end portion 6a of lateral wall 6 of cup-shaped body 3 has a transverse annular formation 3a projecting radially outwards in the form of a flange.

Figure 4:
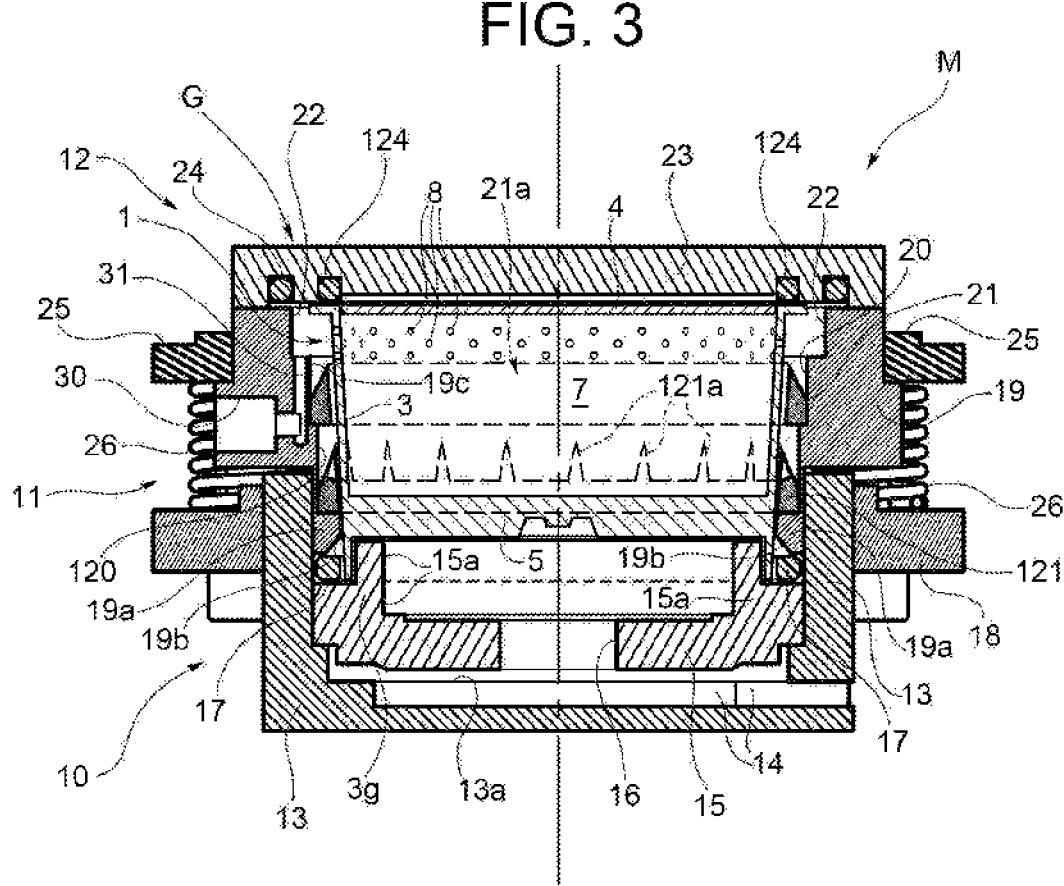
FIG. 4 is a partial view in axial cross-section showing part of a machine for the preparation of a beverage using a cartridge according to the preceding figures.

As will better be seen in FIGS. 3 and 4, the upper surface or face of the upper end wall or cover 4 is preferably flush with the upper surface of the flange formation 3a in body 3.

The upper portion 6a of the annular lateral wall of envelope 2 is provided with a plurality of microholes 8 which make it permeable to water. Microholes 8 may have a cross-section such as to prevent the substance contained in the envelope for preparation of the beverage from escaping, and/or a filter, for example of paper or the like, which is capable of retaining the aforesaid substance within envelope 2 may be located within envelope 2 immediately adjacent to the inner surface of its lateral wall 6.

Figure 2:
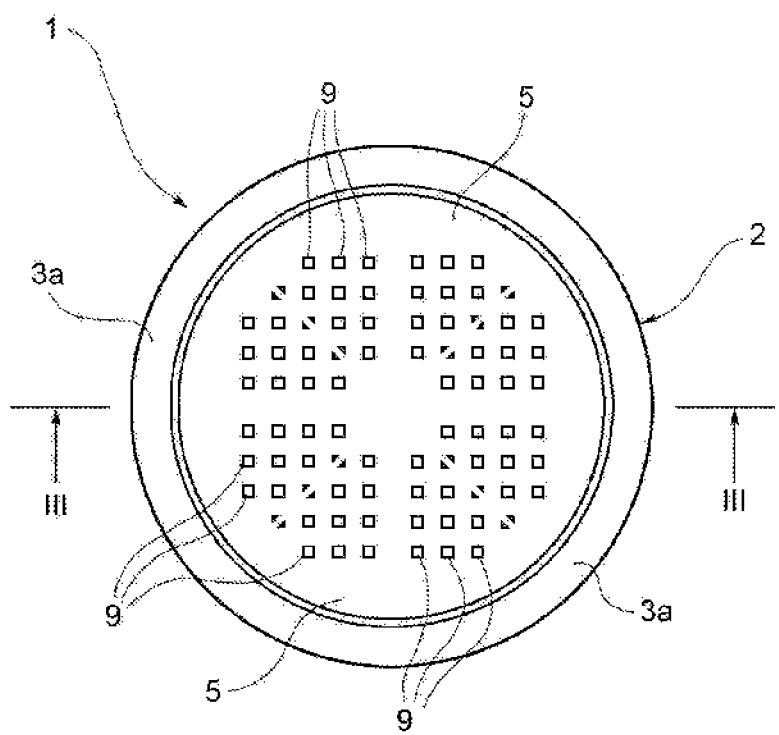
FIG. 2 is a plan view of a cup-shaped body included in the cartridge according to FIG. 1 in plan view from above.

At least one portion of lower end wall 5 of envelope 2 is also preferably provided with microholes, indicated by 9 in FIGS. 1 and 2, such as to render the said portion of wall permeable to the liquid beverage prepared through contact between substance S present in cartridge 1 and the water added to it through inlet portion 6a of its lateral wall 6.

As will be more clearly apparent below, in use the upper portion 6a of lateral annular wall 6 of the envelope is capable of acting as an inlet for the introduction of a flow of water into inner chamber 7 of the cartridge in order to prepare a beverage. In addition to this, the perforated wall of base 5 is able to act as an outlet for the outflow of beverage from chamber 7 towards a collecting vessel such as a cup or the like.

Between portion 6a of the lateral wall and lower end wall 5 envelope 2 has an annular formation 3g projecting outwards. In the embodiment illustrated in the drawings, which is currently preferred, this annular formation 3g extends as an elongation of lateral wall 6 of envelope 2 and projects beyond the wall of lower end 5, substantially in the axial direction of envelope 2.

In the embodiment illustrated in the drawings water is introduced into chamber 1 for preparation of the beverage through only the upper portion 6a of lateral wall 6 of envelope 2.

In other embodiments, not illustrated, further microholes for the entry of water into cartridge 1 may be made in its end wall 4, as in the embodiment illustrated in FIG. 1 of international patent application WO2012/164521A1, already cited previously. In this case the area or cross-section of the flow for the entry of water through upper end wall 4 is preferably in any case smaller than the area or cross-section of flow in upper portion 6a of lateral wall 6 in such a way that the entry of water into inner chamber 7 of the cartridge takes place mainly through its lateral wall 6.

In any event, a cartridge 1 according to this invention may be conveniently manufactured using a biodegradable/compostable material, and in particular a polymer material, preferably a polymer extracted from biomass or a synthetic compostable polymer, or again a polymer produced by genetically modified microorganisms or bacteria, or a polymer manufactured from fossil monomers, or again a material containing natural fibres such as by-products of the food chain (maize, coffee, rice husks, etc.), or obtained from the mowing of meadows, bound together with a binding agent or a polymer mixture.

A beverage may be prepared using a cartridge 1 of the type described above by means of extraction under pressure with a machine of which one embodiment will be described below with particular reference to FIGS. 4 and 6.

As will be seen in particular in FIG. 4, a machine M according to this invention comprises an infusion unit indicated as a whole by G.

Although a rather detailed description of machine M and in particular infusion unit G will be provided below, it is pointed out that this machine and this infusion unit essentially correspond to those described in Italian patent application TO2012A000061 in the name of the Applicant, already mentioned above in this description.

Preferably the lower part 10 of infusion unit G is stationary, and intermediate part 11 and upper part 12 can move with respect to it, as will be more particularly described below.

Lower part 10 of the infusion unit comprises a body 13, essentially in the form of a cup, close to base wall 13a which forms an outflow passage 14.

Within cup-shaped member 13, at a particular distance above its base wall 13a, there is fitted a supporting element 15 of essentially annular shape provided with a central opening 16. This element 15 has in its upper part a projecting annular formation 15a extending upwards for a particular radial distance from the lateral wall of cup-shaped body 13.

In the annular space defined between upstanding formation 15a and the lateral wall of cup-shaped body 13 there is a toroidal sealing ring 17.

Lower part 10 of infusion unit G also includes a plate 18, fixed around the lateral wall of cup-shaped body 13.

Intermediate part 11 of infusion unit G can be moved (vertically for those observing FIGS. 4 and 6) relative to lower part 10.

This intermediate part 11 essentially comprises an annular containing body 19, which has a lower portion 19a movably mounted within the upper part of cup-shaped body 13 of lower part 10.

The lower edge of portion 19a of containment body 19 has a tapering bevel 19b. This bevelled edge 19b can when in use be wedged between the lateral wall of cup-shaped body 13 and sealing ring 17, causing the latter to be radially compressed against upstanding formation 15a of supporting member 15, for the purposes which will be clarified below.

Tapering body 19 has an intermediate portion 19c within which there is an annular seat 20 on which there is provided an annular perforating member 21, whose functions will be clarified below, on a shoulder.

Seat 20 of containment element 19 communicates with an adjacent seat 22 (see in particular FIG. 4) formed in the upper part of element 19, which opens out at the annular summit edge of that element 19.

Annular perforating element 21 is essentially in the form of an annular knife, with a single cutting edge 21a (FIG. 4) facing upwards.

Figure 6:
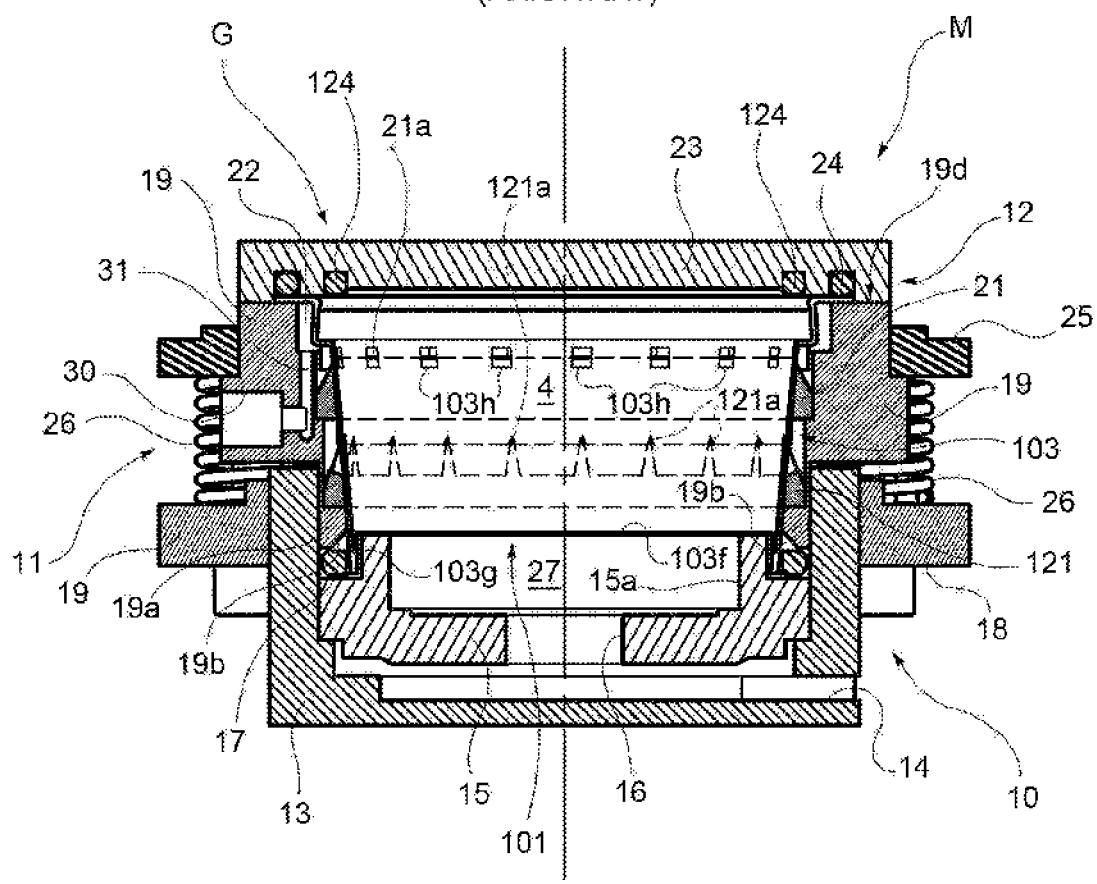
FIG. 6 is a partial axial cross-sectional view which shows part of the same machine as in FIG. 4 in a condition in which a cartridge according to the prior art illustrated in FIG. 5 is being used instead of a cartridge according to this invention.

Infusion unit C shown in FIGS. 4 and 6 comprises a further annular perforating element indicated by 121 mounted on a further seat 120 in containment body 19, in an axially offset position (downwards for those looking at FIGS. 4, 6) in relation to that of perforating element 21.

Perforating element 121 has a plurality of cutting points or teeth 121a spaced apart circumferentially, whose functions will be clarified below.

Upper part 12 of infusion unit G substantially comprises a sealing element 23, essentially in the form of a disc, provided below with a first radially outermost annular groove which is engaged by a sealing ring 24, and a second annular radially innermost groove coaxial with the former in which sealing ring 124 is engaged, the latter being designed to press against the upper end wall of a cartridge 1 according to FIGS. 1 to 3.

Figure 5:
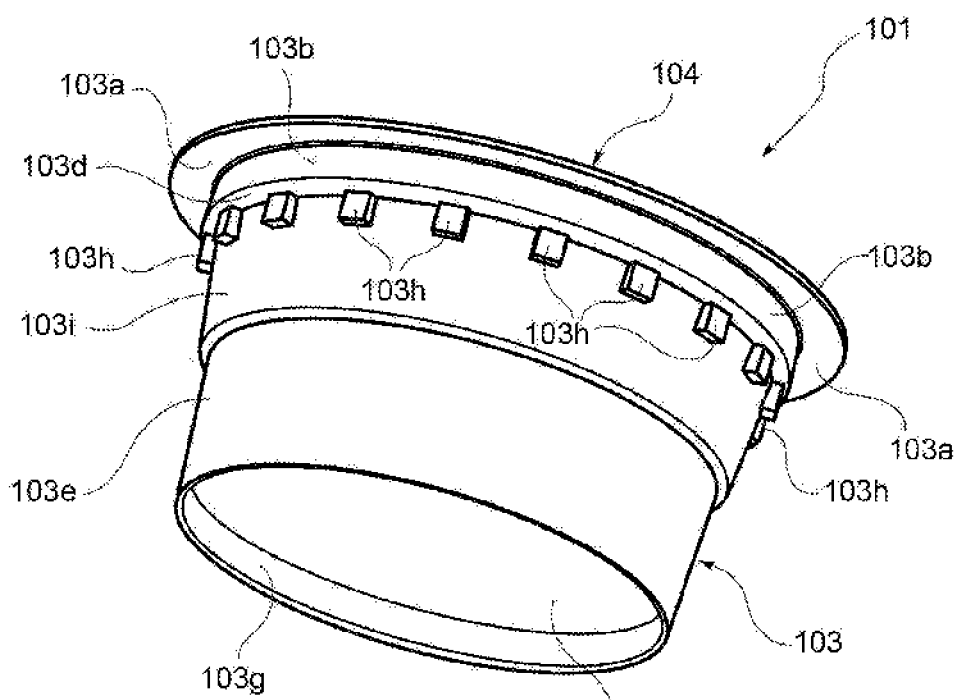
FIG. 5 is a perspective view showing another type of cartridge according to the prior art which can also be used in the machine mentioned on page 4.

As an alternative, part 3a of cartridge 1, that is its upper flange, may be constructed as flange 103a of the cartridge according to the prior art illustrated in FIG. 5.

Sealing element 23 can conveniently move relative to intermediate part 11 in order to allow a cartridge 1 to be inserted within containment element 19, and to enable cartridge 1 to be subsequently discharged when exhausted after delivering the beverage made with it.

In FIGS. 4 and 6 reference number 25 indicates a plate located within containment element 19, lying essentially parallel to plate 18 attached to cup-shaped body 13.

Springs 26 which tend to press plate 25 away from plate 18 and therefore to press intermediate part 11 away from lower part 10 of infusion unit G are placed between plates 18 and 25.

In the wall of containment element 19 there is provided a transverse passage 30, the radially innermost extremity of which communicates with a region within that containment element 19 through at least one longitudinal passage 31.

When in use, a cartridge 1 of the type described above with reference to FIGS. 1 to 3 is placed within containment element 19, when the upper part 12 of infusion body G is in a position away from its intermediate part 11.

Lateral wall 6 of this cartridge 1 has transverse dimensions such that it can be inserted into infusion unit G, in particular through perforating elements 21 and 121, which do not interact with it in any way. The diametrically outermost dimension of downwardly projecting formation 3g corresponds substantially to the diametrical dimension of sealing ring 17 in its undeformed condition, that is when the latter is not subjected to radial compression by bevelled edge 19b of containment body 19.

Through kinetic mechanisms which are known to or at least within the purview of those skilled in the art, upper part 12 of infusion unit G is abutted against the upper edge of containment element 19. Innermost sealing ring 124 of sealing element 23 is then made to abut the upper surface of cartridge 1 in a liquid-tight way.

If in an alternative embodiment the upper flange of the cartridge is constructed in the same way as flange 103a of the cartridge illustrated in FIG. 5, innermost sealing ring 24 of sealing element 23 is then able to abut against the upper surface of the cartridge in a liquid-tight way.

Lower edge 3g of cartridge 1 is then inserted between upstanding formation 15a of supporting element 15 and toroidal sealing ring 17. The latter is compressed against the outer surface of that edge 3g of cartridge 1 as a result of it being engaged by the lower bevelled edge 19b of containment element 19.

Through the effect of the force of sealing elements 124 (or 24 in the case of a cartridge having a flange such as that indicated by 103a in FIG. 5) and 17, annular chamber 20, 22, which is defined within containment element 19 by the top part of cartridge 1, is provided with a liquid-tight seal above and below.

Sealing ring 124 (or 24) separates that annular chamber 20, 22 from the region above cover 4 of the cartridge, while lower sealing ring 17 disconnects annular chamber 20, 22 from the region beneath cartridge 1 and outflow passage 14.

When infusion unit G is in the sealed condition a flow of pressurised hot water can then be fed to aforesaid annular chamber 20, 22 through passages 30 and 31. The pressurised hot water can then penetrate within cartridge 1 through microholes 8 made in its lateral wall 6.

A plurality of streams of pressurised hot water radially converging towards the axis of the cartridge and progressively descending in the direction of its base wall 5 is thus injected into cartridge 1.

Wall 5, which is conveniently provided with microholes 9 as illustrated in FIGS. 1 and 2, then allows the beverage to flow out without the need to be torn or perforated.

As an alternative, base wall 5 of the body of cartridge 1 may be of the impermeable type, but may be torn through the effect of the increasing pressure within cartridge 1.

According to a further alternative, in a manner which is not illustrated in the drawings in the region above base wall 5 of cartridge 1 there may be provided a further perforation element with projections or points designed to tear or perforate that base wall 5 and consequently allow the beverage to flow out.

In any event the beverage flowing out from cartridge 1 passes through outflow passage or conduit 14 through passage 16 in supporting element 15 and can be delivered to a collecting vessel, such as a cup or glass.

Once the beverage has been delivered, delivery unit G is again opened and its intermediate part 11 and upper part 12 again take up their respective initial positions.

Spent cartridge 1 can be removed, for example by means of a spring expulsion device located in the region between that cartridge 1 and supporting element 15.

As mentioned previously, machine M and in particular infusion unit G described above with reference to FIG. 4 are essentially of the type forming the subject matter of previous Italian patent application no. TO2012A000061. This machine and this infusion unit according to the prior art have in fact been designed for the use of cartridges previously manufactured according to the prior art, such as cartridge 101 illustrated in FIG. 5 of this application (corresponding to FIG. 13 in Italian application no. TO2012A000061).

With reference to FIG. 5, cartridge 101 according to the prior art has a cup-shaped body 103 which has at the top an essentially planar flange formation 103a which projects radially outward.

Body 103 is conveniently manufactured with a multilayer laminated structure, for example with an inner layer of polypropylene and an intermediate layer of EVOH (copolymer of ethylene and vinyl alcohol) and an outer layer of polypropylene.

In the embodiment illustrated in FIG. 5 body 103 of cartridge 101 has a lateral wall which has a formation 103b, projecting transversely outward, adjacent to flange 103a, which extends circumferentially about its entire perimeter.

In particular, from flange 103a projecting formation 103b comprises an essentially cylindrical upper portion 103c followed by a step portion 103d in which the diameter of its transverse cross-section is reduced.

The lateral wall of cup-shaped body 103 also has a portion of principal wall 103e, which is for example frustoconical, connecting to a raised base wall 103f, forming an annular edge 103g projecting downwards.

Cartridge 101 also comprises a cover 104 (FIG. 5) connected to flange 103a of cup-shaped body 103, for example by thermal welding or ultrasound welding.

Cover 104 may for example be constructed with a multilayer structure, including an inner polypropylene layer and an outer aluminium layer.

Taken together, cover 104 and cup-shaped body 103 define a chamber which contains a quantity or dose of material for the preparation of a beverage, for example ground roast coffee.

The lateral wall of cup-shaped body 103 has a circumferential formation 103i, projecting transversely outward, in its median portion.

The lateral wall of body 103 of cartridge 101 also has a circumferential ring of transversely outwardly projecting formations 103h in the form of alveoli which are angularly spaced apart.

Perforating elements 21 and 121 of the said infusion unit G are borne by containment element 19 in axially offset respective positions in such a way that circular cutter 21a of perforating element 21 can tear projecting portions 103h, while points or teeth 121a of perforating element 121 can produce a plurality of tears in the projecting circumferential formation 103i of the cartridge.

Using a cartridge 101 in unit G as illustrated in FIG. 6 it is possible to make a double plurality of openings in the lateral wall of that cartridge 101 so that pressurised hot water can be effectively injected within it.

Also, in the case where a cartridge 101 is used, projecting formation 103g of that cartridge, acting together with the associated toroidal sealing ring 17 radially compressed by the inclined plane 19b of containment element 19, provides an effective liquid-tight disconnection between the chamber in which pressurised water is injected into the cartridge and the outlet for the beverage made.

If a cartridge of the type illustrated with reference FIG. 5 is used, radially outermost sealing ring 24 of cover 23 ensures that the chamber in which water is injected into the cartridge is disconnected from the environment outside the infusion unit in the course of extraction of the beverage.

Cartridge 1 according to this invention, described above with reference to FIGS. 1 to 4, is compatible with the use of machine M and infusion unit G in FIG. 6 (in itself known for the use of a cartridge according to FIG. 5), but is also suitable for use with all other machines or infusion units illustrated and described in previous Italian patent application TO2012A000061 by the Applicant.

Of course, without affecting the principle of the invention, embodiments and details of construction may be varied widely from what has been described and illustrated purely by way of a non-limiting example without thereby going beyond the scope of the invention as defined by the appended claims.

Thus, for example, annular formation 3g of body 2 of cartridge 1 may be constructed of one piece with that body, or may be constructed separately from that body and subsequently attached to it by for example welding.

Lower portion 5, 3g of body 2 may also be made and shaped by thermoforming.

The invention claimed is:

1. A system for the preparation of a beverage, the system comprising:
   a cartridge and a machine for use with said cartridge, wherein
   the cartridge comprises an envelope having a top end wall, an annular lateral wall, and a bottom end wall, the bottom end wall being connected to the top end wall by the annular lateral wall,
   a lower side of the bottom end wall is exposed to the outside of the cartridge,
   an upper side of the bottom end wall defines, together with the top end wall and the annular lateral wall, an internal chamber, the internal chamber containing an amount or dose of a substance for preparation of the beverage;
   said envelope has at least one first permeable wall and at least one second permeable wall, the at least one first permeable wall and the at least one second permeable wall defining an inlet and an outlet, respectively allowing an introduction of a flow of water into the internal chamber, and allowing an outflow of the beverage from the internal chamber;
   said envelope further having an annular formation extending downwardly as a prolongation of the annular lateral wall, the annular formation protruding downwardly beyond said bottom end wall, substantially along an axial direction of the envelope;
   the at least one first permeable wall is in the annular lateral wall;
   the annular formation being the bottom most portion of the cartridge;
   the machine comprises an infusion unit adapted to receive said cartridge, a supply unit allowing a flow of water to be introduced into the cartridge, and a discharge unit allowing for an outflow of the beverage formed in the infusion unit toward a collecting vessel;
   the infusion unit including a plurality of parts arranged to be coupled together in a leak-tight way to define, as a whole, an infusion chamber configured to receive the cartridge,
   the infusion chamber being configured to define, relative to the cartridge positioned therein, an annular space connectable to the supply unit and separated in a liquid-tight manner from the discharge unit;
   a first stationary part of said plurality of parts having a first cup-shaped body and a deformable first sealing ring,
   the annular formation abuts against the deformable first sealing ring when the cartridge is positioned in the infusion chamber when the infusion chamber is closed,
   a second part of said plurality of parts includes an annular containing body having a lower edge portion, the lower edge portion being movably mounted within an upper part of the first stationary part,
   the second part having a tapering bevel wedged between a lateral wall of the first stationary part and the deformable first sealing ring,
   when the infusion chamber is closed, the deformable first sealing ring deforms radially against the annular formation so as to separate the infusion chamber from the discharge unit in a liquid-tight manner, and
   the infusion unit further includes a disc-shaped sealing element having a first radially outermost annular groove which is engaged by a second sealing ring, and a second radially innermost annular groove which is coaxial with the first radially outermost annular groove and in which a third sealing ring, pressing against the top end wall of the cartridge is engaged.

2. The system of claim 1, wherein the envelope includes a transverse annular formation protruding radially outward as a flange, around the top end wall.

3. The system of claim 2, wherein the first permeable wall is provided only in the annular wall.

4. The system of claim 1, wherein the envelope has one of a cylindrical, frustoconical, prismatic, or frustopyramidal shape.

5. The system of claim 1, wherein the envelope of the cartridge is formed in a second cup-shaped body and includes a mouth at an upper end thereof, and
   wherein the envelope of the cartridge is made of an injection moulded plastics material.

6. The system of claim 5, wherein the envelope of the cartridge further includes a cover connected to the mouth thereof.

7. The system of claim 5, wherein the injection-moulded plastics material of the envelope is chosen from the group comprising:
   polylactic acid (PLA),
   poly-L-lactide (PLLA),
   poly-D-lactide (PDLA),
   stereo complex blends of PDLA and PLLA,
   corn starches,
   cellulosic materials,
   PLA-, PDLA-, PLLA-based compounds, with mineral fillers,
   PLA-, PDLA-, PLLA-based compounds with mineral fillers and plasticisers,
   PLA-, PDLA-, PLLA-based compounds and cellulose,
   compounds based on corn starches, with mineral fillers,
   polybutylene succinate,
   polybutylene succinate with mineral fillers,
   polymers produced by micro-organisms or bacteria, such as PHA (poly-hydroxy-alkanoates) or PHB (poly-beta-hydroxy-butyrate),
   compounds of plant fibres and starches,
   compounds of plant biomass and starches,
   compounds of plant fibres and PLA,
   compounds of plant biomass and PLA, and
   combinations of the materials listed above.

8. The system of claim 1, wherein the annular formation is open at a bottom thereof.

9. The system of claim 1, wherein the annular formation is the only formation protruding downwardly from the bottom end wall.

* * * * *